S. E. COOK.
BAKER'S OVEN.
APPLICATION FILED JULY 17, 1920.

1,401,392.

Patented Dec. 27, 1921.
2 SHEETS—SHEET 1.

Inventor
Samuel E. Cook
By Herbert E. Smith
Attorney

S. E. COOK.
BAKER'S OVEN.
APPLICATION FILED JULY 17, 1920.
1,401,392.
Patented Dec. 27, 1921.
2 SHEETS—SHEET 2.
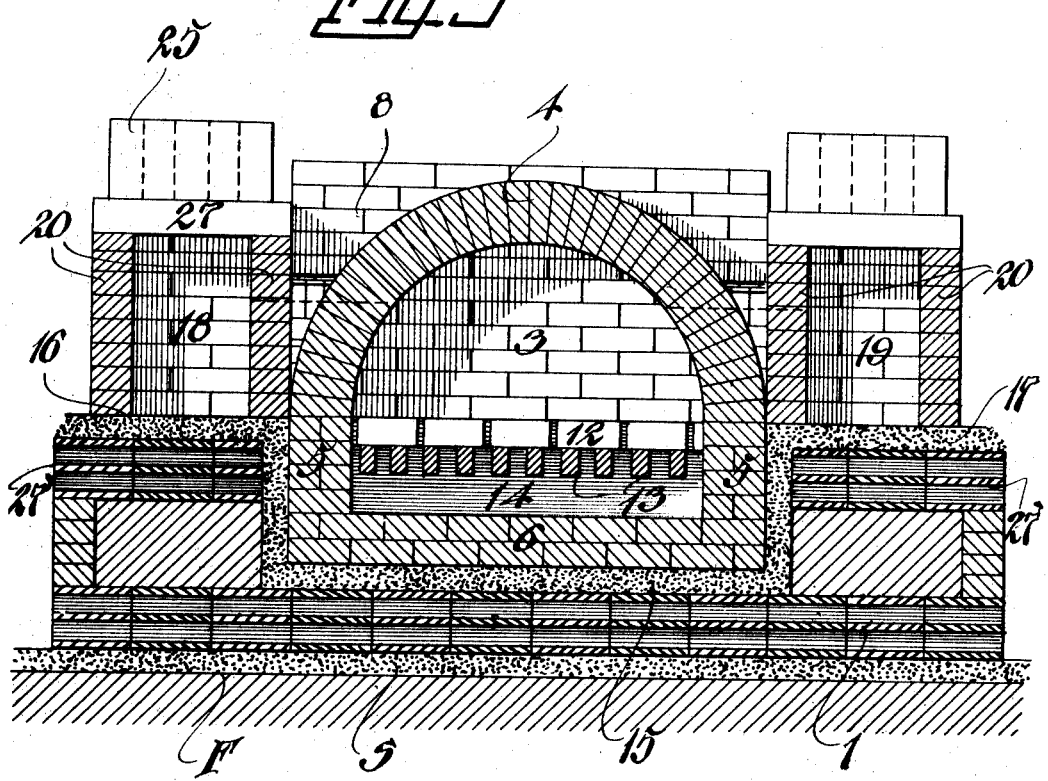
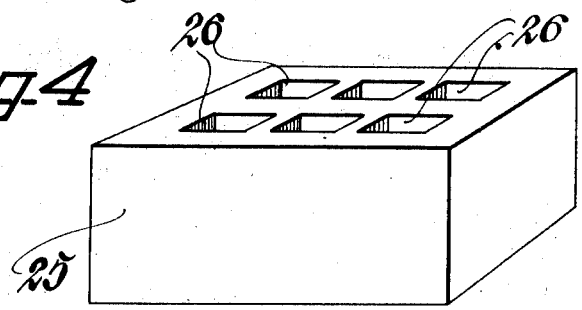
Inventor
Samuel E. Cook
By Herbert E. Smith
Attorney

UNITED STATES PATENT OFFICE.

SAMUEL E. COOK, OF SPOKANE, WASHINGTON.

BAKER'S OVEN.

1,401,392.   Specification of Letters Patent.   Patented Dec. 27, 1921.

Application filed July 17, 1920. Serial No. 397,052.

*To all whom it may concern:*

Be it known that I, SAMUEL E. COOK, a citizen of the United States, residing at Spokane, in Spokane county, and State of Washington, have invented certain new and useful Improvements in Bakers' Ovens, of which the following is a specification.

The present invention relates to an improved baker's oven of the type usually employed for baking crackers, and similar articles, and in the accompanying drawings and specification I have specially adapted the principles of the invention for utilization in connection with a baking apparatus wherein the articles to be baked are supported on a rotary reel. It will be apparent however that the novel combinations and arrangements of parts contemplated in the invention are equally adaptable for use in other relations in baking ovens, and I do not therefore confine myself to this type of oven, or to the baking of enumerated articles above indicated.

In many instances the baking ovens are located in the upper stories of the building occupied by a bakery or cracker factory and the structures of the ovens are built upon the floor of the factory building, which floor may be of concrete construction. The present invention involves an oven structure especially adapted for this character of construction and utilizes an insulation layer and ventilating feature designed to prevent radiation of heat from the oven to the floor of the factory. The feature of insulating, or the use of non-conducting materials, is also embodied in the structure of the oven, together with ventilating structures, to prevent radiation and loss of heat, and to facilitate and expedite the removal of worn parts of the oven structure.

The invention consists in certain novel combinations and arrangements of parts whereby a uniformity of heat is provided in the baking chamber; contraction and expansion of parts are provided for under the action of heat without danger of cracking the walls, and other advantages are secured, as will be hereinafter pointed out.

In the accompanying drawings I have illustrated one complete example of the physical embodiment of my invention in which the parts are combined and arranged according to the best mode I have thus far devised for the practical application of the principles of my invention.

Fig. 3 is an enlarged, transverse, vertical sectional view of the oven at line 3—3 of Fig. 1.

Fig. 4 is a detail perspective view of a ventilating flue cap, two of which are utilized in connection with the lateral return flues of the heating chamber of the oven.

Figure 1:
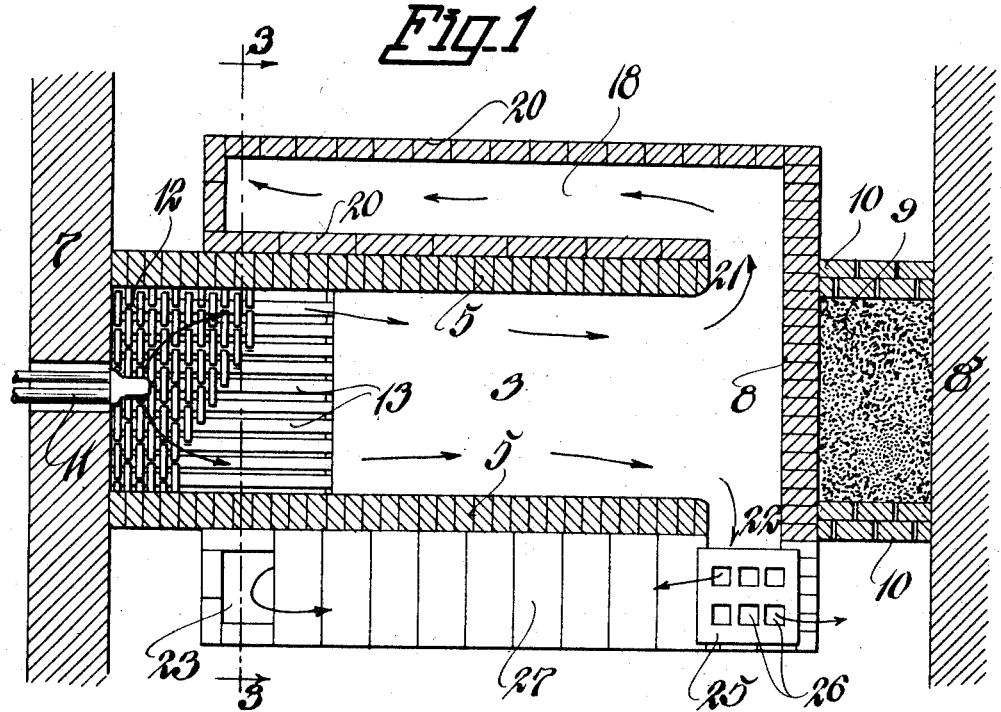
Figure 1 is a plan view, partly in horizontal section of a cracker oven employing an oil burner, and constructed according to the present invention.

In the preferred form of the invention as illustrated in the drawings the floor of the factory or building in which the oven is located is indicated at F and may be of concrete or similar construction, and upon the top of the floor is provided a layer of sand or other granulated, non-conducting or insulating material, S upon which is erected the oven structure.

The substructure or base of the oven is made up of a front section 1 and a rear section 2 of tiles, preferably laid in one course, and alined transversely of the oven structure to provide continuous conduits through which air may circulate beneath the oven structure and assist the insulating or non-conducting layer of sand in preventing transmission of heat to the concrete floor F.

These foundation sections of hollow tile form a substantial support for the oven structure which is erected thereon.

The central heating chamber 3 of the oven is fashioned with an arched crown 4 and vertical side walls 5, 5, rising from the base 6, and at the front of the oven the chamber is closed by the front wall 7 of the oven. At its rear the heating chamber is bounded by the back 8, spaced from the rear supporting wall 8' and between the back wall 8 and rear supporting wall 8' may be interposed the bracing member formed of sand as 9 with side retaining walls 10.

The walls, crown, and base of the heating chamber are built of fire brick as usual, and it will be noted that these parts form a rigid, self contained structure, built up separately from the remainder of the oven for the purpose of localizing the expansion and contraction actions thereof due to heat in the heating chamber.

The oil burner 11 for furnishing heat to the chamber 3 is introduced through an opening in the front wall of the oven and directs its blast of hot gases toward the back 8 of the chamber. Directly beneath the oil burner is provided a checker-work 12 of closely spaced bricks and supported on the longitudinally extending grate bars 13 secured in the base of the heating chamber or combustion chamber of the oven, and forming a pit 14 beneath the grate bars. While the oil burner is in operation it will be apparent that the checker-work of brick above the grate bars will be heated to an excessive degree, and consequently any spray or dripping of unburned oil from the burner nozzle which may fall upon the heater checkerwork will be vaporized or gasified and burned. The consumption of gases or oil in this manner insures perfect combustion, and at the same time prevents any accumulation of unburned gases in the combustion chamber with consequent danger of explosion, due in many instances to carelessness or negligence in attention to the oil burner.

Below the base or floor of the combustion chamber a lining of insulating material, as sand, is provided at 15, and this lining at a higher plane than the base of the combustion chamber, as indicated at 16 and 17 in Figs. 2 and 3, forms the bottom or base of the two return flues 18 and 19, at the sides of the combustion chamber.

These flues extend longitudinally of the oven and parallel with the combustion chamber, and are erected as separated and independent structures from the combustion chamber, the walls 20 of the flues rising from the floors 16 and 17 thereof, and built up in courses of fire brick. At the rear of the combustion chamber, communication is made with the flues through lateral openings 21, 22, through the respective walls 5 and 20 of the combustion chamber and flues, and the return currents of heated gases are passed through the flues toward the front of the open, and thence out and upwardly through the top ports 23 of the flues.

To insure uniformity in the distribution of heat to the baking chamber 24 of the oven located above the flues and combustion chamber and suitably inclosed. I provide means, as cap-blocks 25, 25, with vertical conduits therethrough indicated at 26, 26. Two of these blocks are utilized, one at the rear of each flue, and located over a top opening in the ceiling 27 of the flues, in order that heated gases passing through the openings 21 and 22 to the flues may pass upwardly through the conduits 26. Thus a portion of the gases are distributed at the rear of the oven at these two points, and the remainder of the gases return to the front of the oven and are distributed through the two openings or ports 23, as indicated by the arrows in Fig. 1 to provide for a uniform heating of the baking chamber 24 of the oven.

As best seen in Fig. 3 the central combustion chamber and the side flues are separate and independent structures, the latter being erected on their floors 16 and 17, and beneath these floors are provided ventilating structures made of hollow tiles 27' forming the rear sections 2, for carrying off heat from the flues that may pass through the floors of the flues.

Figure 2:
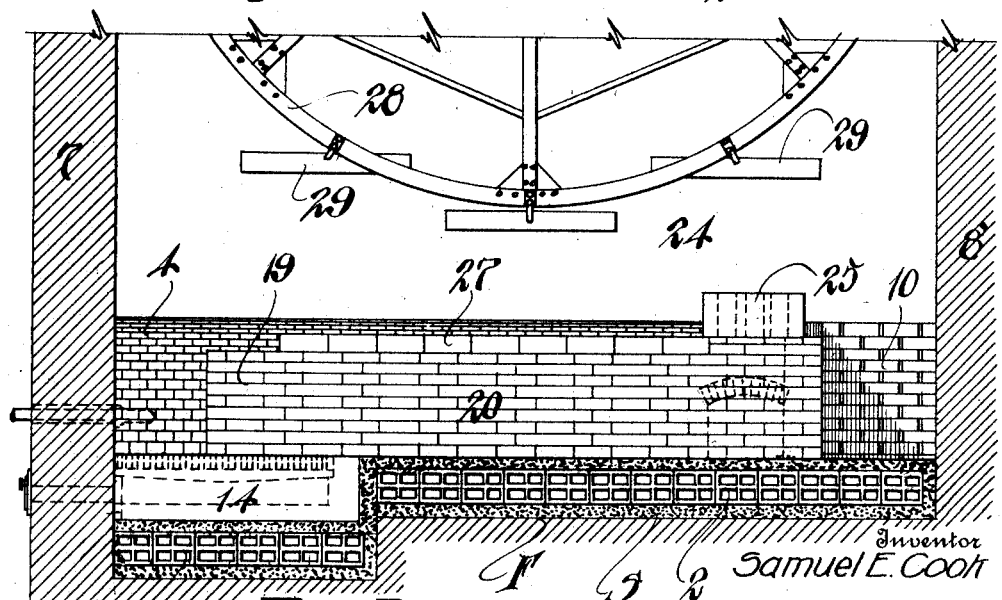
Fig. 2 is a view in side elevation of a portion of the oven, showing the front and rear walls in section, and indicating a portion of a rotary carrier or reel for crackers, in the baking chamber of the oven.

In Fig. 2 a portion of a reel or rotary carrier 28 is indicated, with trays 29 for supporting the articles to be baked and it will be obvious that the function of the carrier is to transport the articles to be baked through the heated baking chamber 24, during which movement the articles are baked by contact of the heat in the chamber.

By the utilization of my invention and the construction of a baker's oven according to the principles of the invention hereinbefore set forth, a more durable and efficient heating appliance is provided than is found in the prevalent type of ovens of this character, for in the use of similar ovens with which I am familiar, it becomes necessary to reconstruct the ovens at comparatively frequent intervals at a cost of considerable sums of money and loss in time from the use of the oven. Because of the separation of the flue structures from the central combustion structure, the interposition of the insulating layers, or layers of nonconducting material, and the utilization of the hollow tile to provide for circulation of air below and under the structures, the wear on the structures due to expansion and contraction from heat is materially decreased. The distribution of the heat from the combustion chamber and flues provides for uniformity in heating the baking chamber, and the separation of these flues from the combustion chamber eliminates considerable loss from otherwise radiated heat. The arched crown of the combustion chamber becomes heated sufficiently to provide a white heat for the baking chamber. A draft opening or chimney is not necessary for a proper operation of the oven, other than a slight escape of heat through the discharge and charge opening at the top of the baking chamber for the introduction and withdrawal of the crackers or other articles to be baked. The oven may be operated substantially as a continuous oven and maintained at a high degree of heat for long periods of time.

What I claim is—

1. The combination in a baker's oven, of a central combustion chamber, and a separate return flue structure at each side of the combustion chamber having front openings into the baking chamber above the combustion chamber, and a perforated cap block above a rear opening in the ceiling of each flue to provide for equal distribution of heat to the baking chamber.

2. The combination in a baker's oven, of a central combustion chamber and separated return flues parallel therewith and opening into the baking chamber having front openings into the baking chamber above the combustion chamber, and a perforated cap block above a rear opening in the ceiling of each flue, non-conducting material arranged in layers below the combustion chamber and flues, and ventilating structures below these layers to provide for lateral movement of air currents, for the purpose described.

3. In a baker's oven the combination with a combustion chamber having a front pit and grate bars, of a brick checker-work located on said bars and an oil burner above said checker-work, elevated flues at the sides of said combustion chamber and communicating therewith, front and rear openings at the ends of said flues, and a perforated cap-block over said rear openings, for the purpose described.

In testimony whereof I affix my signature.

SAMUEL E. COOK.